US010062154B1

(12) United States Patent
Liu et al.

(10) Patent No.: US 10,062,154 B1
(45) Date of Patent: Aug. 28, 2018

(54) SYSTEM AND METHOD FOR ADAPTIVE CONTRAST ENHANCEMENT (71) Applicants: SYNAPTICS INCORPORATED, San Jose, CA (US); SYNAPTICS LLC, Zug (CH)

(72) Inventors: Li Liu, San Jose, CA (US); Dam Le Quang, Hochiminh (VN)

(73) Assignees: SYNAPTICS INCORPORATED, San Jose, CA (US); SYNAPTICS LLC, Zug (CH)

(*) Notice: Subject to any disclaimer, the term of this patent is extended or adjusted under 35 U.S.C. 154(b) by 210 days.

(21) Appl. No.: 15/040,213

(22) Filed: Feb. 10, 2016

Related U.S. Application Data (60) Provisional application No. 62/115,048, filed on Feb. 11, 2015.

(51) Int. Cl.
G06K 9/00 (2006.01)
G06T 5/40 (2006.01)
G06K 9/46 (2006.01)
G06K 9/52 (2006.01)

(52) U.S. Cl.
CPC .............. *G06T 5/40* (2013.01); *G06K 9/4642* (2013.01); *G06K 9/4661* (2013.01); *G06K 9/52* (2013.01); *G06K 2009/4666* (2013.01); *G06T 2207/30168* (2013.01); *G06T 2207/30242* (2013.01)

(58) Field of Classification Search
CPC .......... G06T 5/40; G06T 5/002; G06T 5/005; G06T 5/006; G06T 2207/20182; G06K 9/4642; G06K 9/4661; G06K 9/52; G06K 2009/4666; G06K 9/6212; H04N 5/217; H04N 5/357
See application file for complete search history.

(56) References Cited

U.S. PATENT DOCUMENTS

2006/0239581 A1* 10/2006 Neuman ................ G06T 5/009
                                                              382/274
2011/0206280 A1*  8/2011 Lee ..................... G06T 5/009
                                                              382/167
2012/0093433 A1*  4/2012 Gupta ................... G06T 5/002
                                                              382/260
2016/0335750 A1* 11/2016 Usman .................. G06T 5/008

* cited by examiner

Primary Examiner — Yon Couso
(74) Attorney, Agent, or Firm — Paradice and Li LLP (57) ABSTRACT

Apparatus, methods, and other embodiments associated with image processing operations are disclosed that provide image contrast enhancement. According to one embodiment, an apparatus includes histogram stretching logic to generate a stretched histogram. The stretched histogram is generated by compressing an enlarging a contrast of brightness bins of an equalized histogram of brightness component values formed from a previous input frame of image pixel data. Flat region detection logic classifies pixels of the previous input frame of image pixel data as being flat pixels or non-flat pixels, and counts a number of the flat pixels. Noise detection logic classifies the flat pixels as being noisy pixels or non-noisy pixels, and counts a number of the noisy pixels. The number of noisy pixels and characteristics of the stretched histogram are used to enhance the contrast of a current input frame of image pixel data.

17 Claims, 6 Drawing Sheets

SYSTEM AND METHOD FOR ADAPTIVE CONTRAST ENHANCEMENT

CROSS REFERENCE TO RELATED APPLICATIONS

This patent disclosure claims the benefit of U.S. Provisional Application Ser. No. 62/115,048 filed on Feb. 11, 2015, which is hereby wholly incorporated by reference.

BACKGROUND

In image processing, one goal may be to achieve contrast enhancement of image frames in, for example, a stream of digital video frames. Enhancing contrast within an image frame can allow for better visual differentiation between feature content within the image frame. The term contrast refers to the amount of brightness component differentiation that exists between image features within an image. Images having a higher contrast level generally display a greater degree of brightness component variation than those of lower contrast. Image brightness (e.g., luma in video images) is a measure of intensity after the image has been acquired with an imaging device or digitized by an analog-to-digital converter.

SUMMARY

In general, in one aspect this specification discloses an image processing apparatus that includes a histogram stretching module, a flat region detection module, and a noise detection module for performing contrast enhancement of video images. The histogram stretching module is configured to generate a stretched histogram by compressing and enlarging a contrast of brightness bins of an equalized histogram. The equalized histogram is a histogram of brightness component values formed from a previous input frame of image pixel data in a video stream. The flat region detection module is configured to classify pixels of the previous input frame of image pixel data as being flat pixels or non-flat pixels based at least in part on a variance in a brightness component content associated with the flat pixels being less than a variance in a brightness component content associated with the non-flat pixels. The flat region detection module also keeps a count of the number of flat pixels. The noise detection module is configured to further classify the flat pixels as being noisy pixels (pixels that contain noise) or non-noisy pixels (pixels that do not contain noise). The noise detection module also keeps a count of the number of noisy pixels. The number of noisy pixels and characteristics of the stretched histogram are used to enhance the contrast of a current input frame of image pixel data.

In general, in another aspect, this specification discloses a method that is performable, for example, by an image processing apparatus to provide contrast enhancement of video images. The method includes generating a histogram of brightness component values of a previous input frame of image pixel data. The method also includes generating an equalized histogram of brightness component values by equalizing the histogram of brightness component values. The method further includes generating a stretched histogram of brightness component values by compressing and enlarging a contrast of brightness bins of the equalized histogram. Characteristics of the stretched histogram are used to enhance the contrast of a current input frame of image pixel data.

In general, in another aspect, this specification discloses an integrated circuit device for performing contrast enhancement of video images. In one embodiment, the integrated circuit device includes histogram equalization logic, histogram stretching logic, and noise detection logic. Histogram equalization logic is configured to generate an equalized histogram of brightness component values of a previous input frame of image pixel data. Histogram stretching logic is configured to generate a stretched histogram by compressing and enlarging a contrast of brightness bins of the equalized histogram. Noise detection logic is configured to classify pixels of the previous input frame of image pixel data as being noisy pixels (pixels that contain noise) or non-noisy pixels (pixels that do not contain noise), and count the number of noisy pixels. The number of noisy pixels and characteristics of the stretched histogram are used to enhance the contrast of a current input frame of image pixel data.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Described herein are examples of systems, apparatus, methods, and other embodiments associated with image processing. In particular, embodiments are described herein that are associated with video frame image processing for enhancing contrast in video frames of image pixel data. In one embodiment, the brightness components of a previous input frame of image pixel data are processed. Results of the processing of the previous input frame are used to process a current input frame of image pixel data to enhance the contrast in the current input frame. Combined techniques of histogram equalization, histogram stretching, noise detection, and histogram mapping are employed as part of the processing.

In one embodiment, the brightness components of a frame of image pixel data are luma components. In video, the luma components represent the brightness of an image, as opposed to the chrominance components of an image. The luma components represent the achromatic information in an image and the chrominance components represent the color information in an image. In one embodiment, the contrast of an image (i.e., of a frame of image pixel data) is enhanced by operating on the luma components. Regions or zones of a brightness component histogram (e.g., a luma component histogram) can be defined and processed separately, in accordance with one embodiment, to enhance the contrast in a frame of image pixel data.

Figure 1:
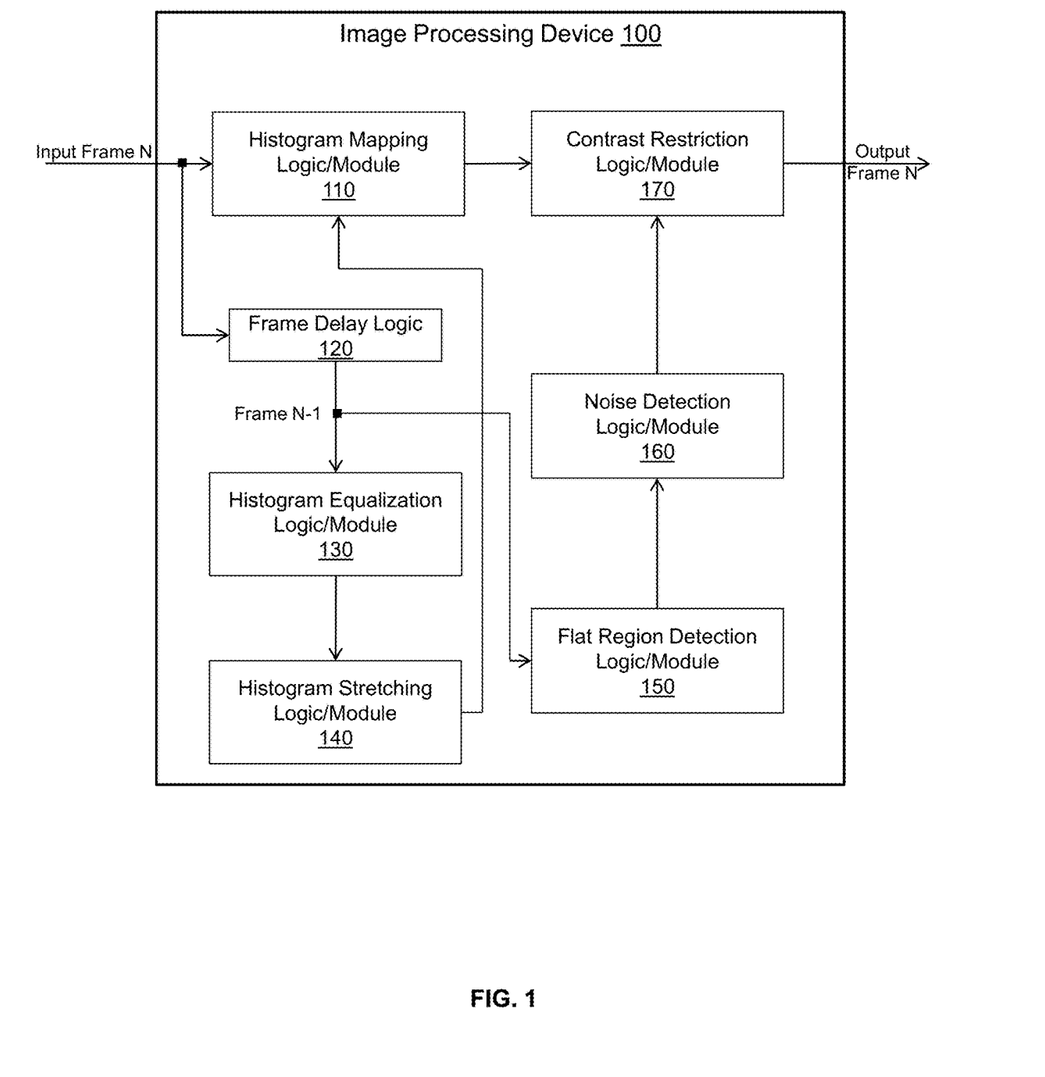
FIG. 1 illustrates one embodiment of an image processing device configured to enhance the contrast of video frames of image pixel data.
Figure 6:
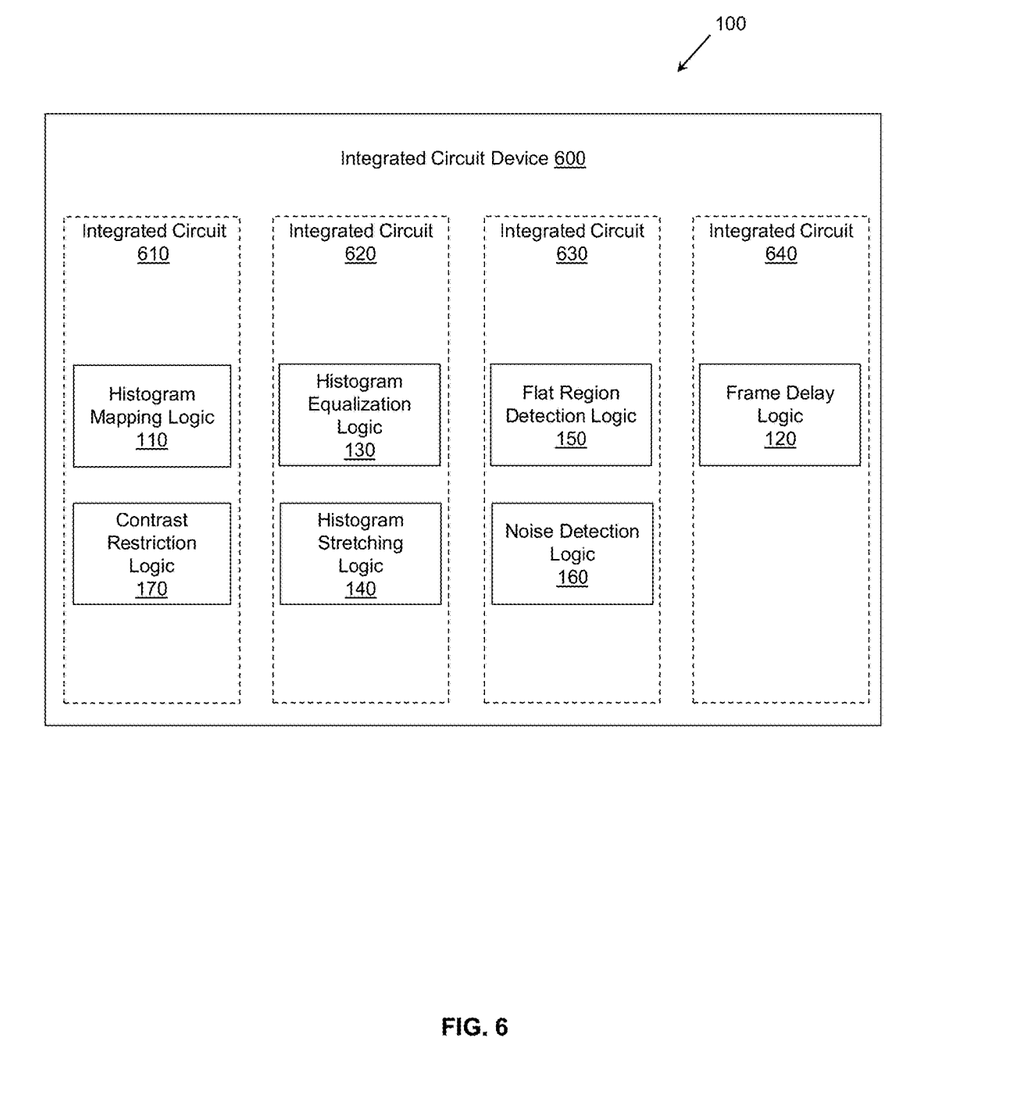
FIG. 6 illustrates one embodiment of the image processing device of FIG. 1 implemented as an integrated circuit device.

The term "input frame", as used herein, refers to a frame of image pixel data that is input or read into the image processing device of FIG. 1 or FIG. 6, for example.

The terms "luma" and "brightness" may be used interchangeably herein. However, "brightness" is the more general term, and a luma component of a pixel is a particular type of brightness component.

FIG. 1 illustrates one embodiment of an image processing device 100 configured to enhance the contrast of video frames of image pixel data. The image processing device 100 includes, but is not limited to, histogram mapping logic 110, frame delay logic 120, histogram equalization logic 130, histogram stretching logic 140, flat region detection logic 150, noise detection logic 160, and contrast restriction logic 170, or any combination thereof. In one embodiment, the image processing device 100 is implemented on a chip (i.e., a system-on-chip or SOC configuration) including one or more integrated circuits configured to perform one or more of the functions described herein. In another embodiment, the logics of the image processing device 100 may be part of an executable algorithm configured to perform the functions of the logics where the algorithm is stored in a non-transitory medium. In accordance with one embodiment, the image processing device 100 may be a part of an image related device. In accordance with another embodiment, the image processing device 100 may be separate from the image related device and may be configured to operably connect to the image related device via an operable connection (e.g., via a network connection).

Other embodiments may provide different logics or combinations of logics that provide the same or similar functionality as the image processing device 100 of FIG. 1. In one embodiment, the image processing device 100 is an executable application including algorithms and/or program modules configured to perform the functions of the logics. The application is stored in a non-transitory computer storage medium. That is, in one embodiment, the logics of the image processing device 100 are implemented as modules of computer-executable instructions stored on a computer-readable medium.

The image processing device 100 of FIG. 1 is configured to receive digitized frames of image pixel data (e.g., frames of image pixel data from a stream of video frames), process the frames, and output contrast-enhanced frames of image pixel data. For example, in one embodiment, the image processing device 100 is a post-processing device in a chain of video image processing devices. A stream of video frames may be processed through the chain in a continuous manner.

In a streaming video situation, successive frames of video are likely to be similar to each other. Therefore, the characteristics of a previous input frame are likely to be similar to the same characteristics of a current input frame. As such, certain processing functions can be performed on a previous input frame and the results can be applied to a next current input frame as if the processing functions were performed on the current input frame. This allows various processing functions of contrast enhancement to be performed in a parallel pipelined manner, enhancing processing efficiency.

Figure 2:
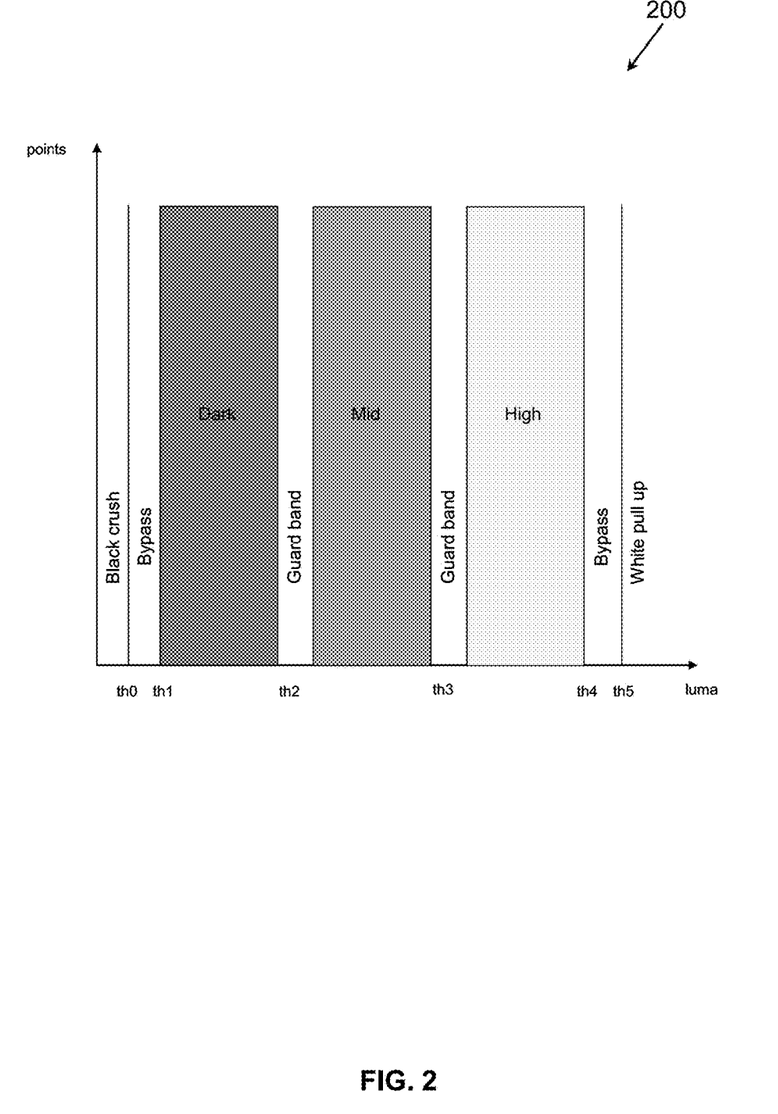
FIG. 2 illustrates one embodiment of regions or zones of a brightness component histogram (e.g., a luma component histogram) which can be processed separately by the image processing device of FIG. 1 to enhance the contrast in a frame of image pixel data.

FIG. 2 illustrates one embodiment of regions or zones of a brightness component histogram (e.g., a luma component histogram) 200. A brightness component histogram can be derived from an input frame of image pixel data. The regions or zones of a brightness component histogram can be processed separately by the image processing device 100 of FIG. 1 to enhance the contrast in a frame of image pixel data. As shown in FIG. 2, the luma component histogram 200 is divided into three primary regions (dark, mid, and high) representing dark tones, mid tones, and bright tones. In accordance with one embodiment, the three primary regions are processed separately by the image processing device 100. That is, pixels having brightness (e.g., luma) component values falling between thresholds th1 and th2 are processed together as dark-region pixels, pixels having brightness (e.g., luma) component values falling between thresholds th2 and th3 are processed together as mid-region pixels, and pixels having brightness (e.g., luma) component values falling between thresholds th3 and th4 are processed together as high-region pixels.

Furthermore, as shown in FIG. 2, guard bands can be programmed on either side (e.g., symmetrically) of the dark-mid and mid-high boundaries to ensure contrast enhancement is continuous and smooth across the three regions. Pixels that fall within the guard bands do not contribute to contrast enhancement in any manner, and the output of those pixels is identical to the input. Also, in one embodiment, there are two programmable sub-dark regions below the dark region. In the first sub-dark region (black crush), the output is made equal to a programmable luma value and can be used as a black crush feature that suppresses detail in the first sub-dark region. In the second sub-dark region (bypass), the output is made equal to the input. Similarly, there are two over-bright regions with similar programmable options. The pixels in such secondary regions do not affect the contrast enhancement functionality in the three primary regions. By programming the thresholds th0-th5, it is possible to eliminate the secondary region features altogether.

Referring again to FIG. 1, histogram mapping logic 110 and frame delay logic 120 are configured to receive an input frame of image pixel data (e.g., a current frame from a video stream of frames of image pixel data). Frame delay logic 120 is further configured to buffer or store the input frame of image pixel data such that processing of the input frame is delayed through histogram equalization logic 130, histogram stretching logic 140, flat region detection logic 150, and noise detection logic 160. As a result, any frame processed through histogram equalization logic 130, histogram stretching logic 140, flat region detection logic 150, and noise detection logic 160 is considered a previous frame in relation to a current frame coming into the image processing device.

In this manner, as frames from a video stream continue to come into the image processing device 100, each new frame becomes the current frame which is processed through histogram mapping logic 110 and contrast restriction logic 170. The previous frame (occurring immediately before the current frame) has been stored such that processing of that previous frame has been delayed by frame delay logic 120. Consequently, results from the processing of a previous frame (through histogram equalization logic 130, histogram stretching logic 140, flat region detection logic 150, and noise detection logic 160) can be used to influence the processing of a current frame (through histogram mapping logic 110 and contrast restriction logic 170).

In one embodiment, histogram equalization logic 130 is configured to receive a previous input frame of image pixel data from frame delay logic 120 and generate an equalized histogram of brightness component values of the previous input frame by spreading out the most frequent brightness component values. The brightness component values are luma component values, in accordance with one embodiment. Histogram equalization logic 130 forms an original image histogram of luma component values from the pixels of the previous input frame, and reassigns the luma component values of the pixels based on a transfer function derived from the original image histogram of luma component values (this is histogram equalization). Individual pixels retain their luma (brightness) order such that they remain brighter or darker than other pixels. However, the luma values are shifted such that an equal number of pixels take on each possible luma value. As a result, luma values get spread out and show more detail in areas with a high luma gradient (thus providing one level of contrast enhancement).

In one embodiment, histogram stretching logic 140 is configured to receive the equalized histogram from histogram equalization logic 130, and generate a stretched histogram by compressing and enlarging a contrast of the luma (brightness) bins of the equalized histogram. Histogram stretching is performed because, after histogram equalization, dark portions of an image frame may still be too dark, and bright portions of the image frame may still be too bright.

In one embodiment, histogram stretching logic 140 applies a stretching algorithm to the equalized histogram by assigning a stretch weight (SW) value. For example, let V be a bin value of the histogram after equalization, and Vs be the bin value of the histogram after stretching. For every bin value V, V is mapped to Vs as follows:

if $V < (th1+th2)/2$ $Vs = th1 + (V - th1) * SW/256;$ else $Vs = th1 + [(th2 - th1)/2 * SW + (V - (th1+th2)/2) * (512 - SW)]/256,$ where SW is the stretch weight value (e.g., between 0 and 511), th1 is a lower threshold limit of a region or zone of the luma bins being processed, and th2 is an upper threshold limit of the region or zone of the luma bins being processed.

In this manner, when SW is smaller than 256, the contrast of bins having values closer to the lower limit of the region are compressed, and bins having values that are closer to the upper limit of the region are enlarged (and vice versa). As a result, the contrast enhancement results of the equalization process are changed by the stretching process. For example, a SW value of 180 may result in less contrast enhancement, than that provided by equalization, in dark areas of an image frame. A SW value of 350 may result in more contrast enhancement in dark areas while maintaining the contrast enhancement from equalization in bright areas.

In one embodiment, the stretched histogram is sent from histogram stretching logic 140 to histogram mapping logic 110. Again, histogram mapping logic 110 is configured to operate on a current input frame of image pixel data, whereas histogram equalization logic 130 and histogram stretching logic 140 are configured to operate on a previous input frame of image pixel data. Histogram mapping logic 110 performs a histogram mapping operation. The histogram mapping operation generates a cumulative transfer function based on the stretched histogram, and applies the cumulative transfer function to a current input frame of image pixel data to form a contrast-enhanced frame of image pixel data. In accordance with one embodiment, the mapping operation includes, for each luma level j in the original current input frame, assigning a new value k according to:

$k = \Sigma N_i / T,$ where the sum, $(\Sigma N_i)$, integrates the stretched histogram over luma values i equal to or less than j, and where T is the total number of pixels in the current input frame (or in a luma region of the current input frame). In this manner, the stretched histogram, derived from the previous input frame, is used to enhance the contrast of the current input frame. Other mapping operations are possible as well, in accordance with other various embodiments.

After the initial contrast enhancement is performed by applying the stretched histogram to the current frame of input pixel data, contrast enhancement may be backed off or limited to a certain extent to avoid over-amplified picture contrast. For example, a maximum slope (max_slope) may be defined in a register of the image processing device 100 and used by contrast restriction logic 170 to effectively limit a maximum slope of the cumulative transfer function derived from the stretched histogram. In this manner, the amount of contrast enhancement in the contrast-enhanced frame of image pixel data output by histogram mapping logic 110 can be limited by contrast restriction logic 170.

Furthermore, it may be desirable to further limit the amount of contrast enhancement due to the noisiness of an input frame of image pixel data. For example, when an input image contains white noise, histogram equalization and stretching can amplify the noise as well as enhancing contrast. Human eyes are more sensitive to noise in flat image areas and, therefore, contrast enhancement in such flat image areas is "handled more delicately", in accordance with one embodiment. To alleviate the visual discomforts caused by over-amplified noise, a noise detection/constraint algorithm is provided. In one embodiment, the noise level of the previous input frame is measured and less contrast enhancement is applied to the current input frame when a noisy previous input frame is detected.

In one embodiment, flat region detection logic 150 is configured to classify pixels of the previous input frame of image pixel data as being flat or non-flat. A region of image pixel data is considered to be "flat" when the brightness component content of the image pixel data is of low activity (low variance). Therefore, a region of image pixel data is considered to be "non-flat" when the brightness component content of the image pixel data is of high activity (high variance). Determining whether an image pixel is flat (belongs to a flat region) or non-flat (belongs to a non-flat region) can be accomplished via computerized mathematical processing, as described later herein. Flat region detection logic 150 is also configured to count the number of pixels classified as being flat.

Noise detection logic 160 is configured to further classify the flat pixels as being noisy or non-noisy. The term "noise", as used herein, refers to image noise. Image noise is not present in the object being imaged. Image noise is a random variation of brightness information in an image and is typically a result of electronic noise produced by a sensor and circuitry of the digital imaging device. For example, one type of image noise is white noise which is a result of a random signal with a constant power spectral density. Determining whether an image pixel is noisy or non-noisy can be done mathematically, as described later herein. Noise detection logic 160 is also configured to count the number of flat pixels classified as being noisy.

Figure 3:
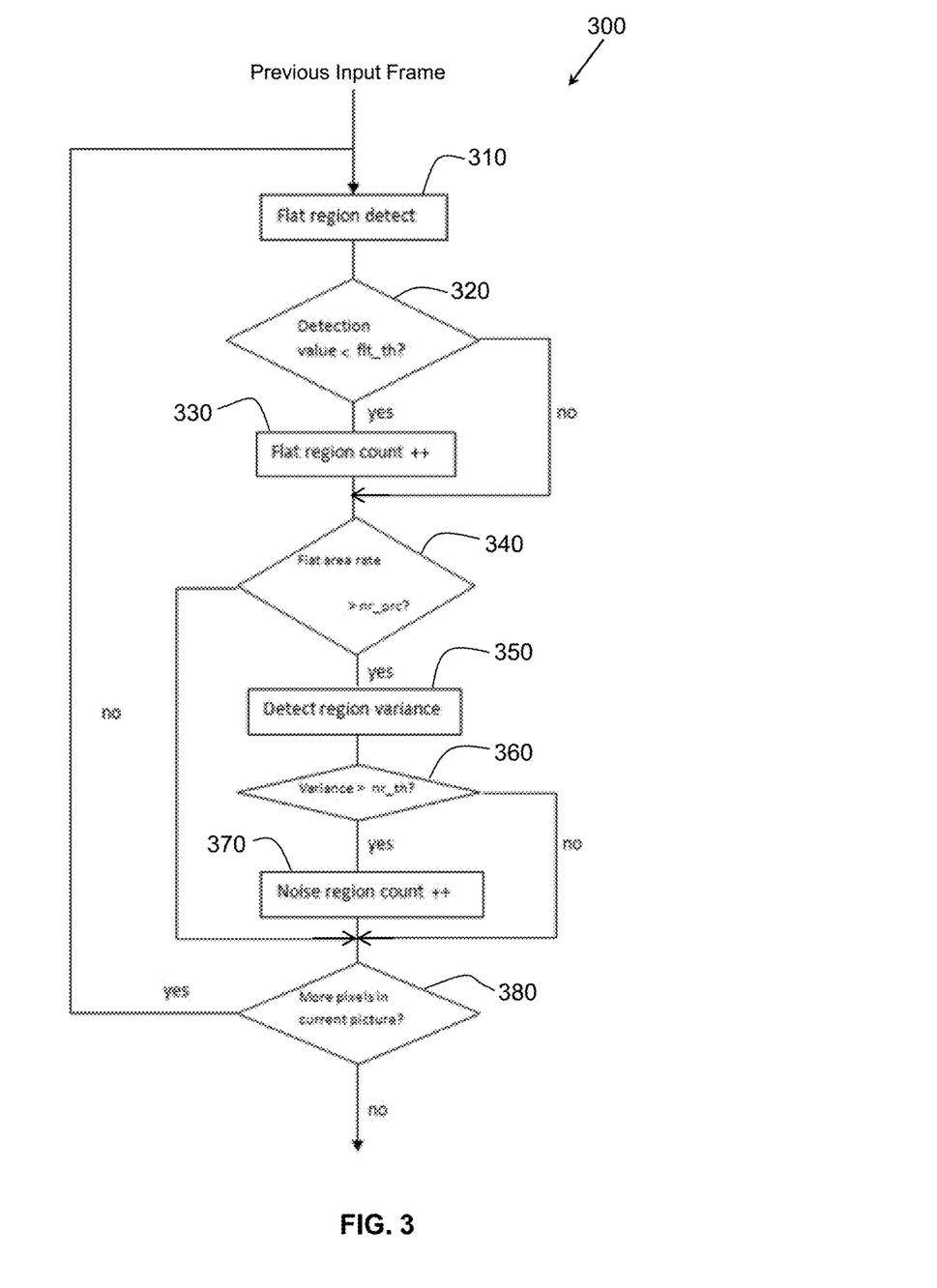
FIG. 3 illustrates one embodiment, performable by the image processing device of FIG. 1, of a method to characterize flat regions and noise in a frame of image pixel data.
Figure 4:
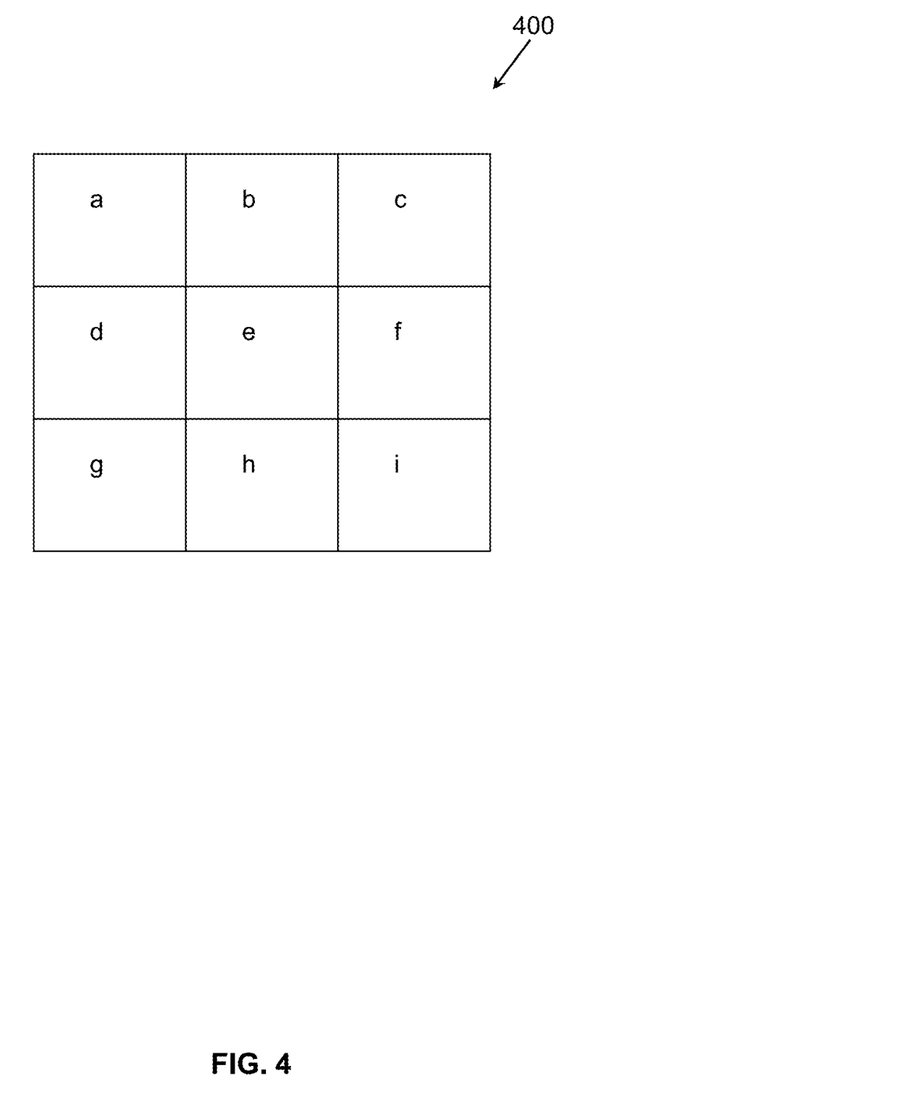
FIG. 4 illustrates one embodiment of an image processing kernel used by the method of FIG. 3 to characterize flat regions and noise in a frame of image pixel data.

FIG. 3 illustrates one embodiment, performable by the image processing device 100 of FIG. 1, of a method 300 to characterize flat regions and noise in a frame of image pixel data. FIG. 4 illustrates one embodiment of an image processing kernel 400 used by the method 300 of FIG. 3 to characterize flat regions and noise in a frame of image pixel data. The method 300 of FIG. 3 will be described with respect to the logics of FIG. 1.

Referring to FIG. 3, flat region detection logic 150 receives a previous input frame of image pixel data. For each pixel, a flatness detection value is determined at 310. The kernel 400 of FIG. 4 is used as a sliding window, with each pixel under consideration centered at position "e" in the kernel 400, and other pixels at positions "a, b, c, d, f, g, h, i" surrounding the center pixel "e". The values of the pixels being processed in accordance with the kernel 400 are brightness (e.g., luma) component values.

In accordance with one embodiment, flat region detection logic 150 generates a flatness detection value at 310 for each pixel of a previous input frame of image pixel data using the kernel 400 as follows:

$f_x = -a - 2b - c + g + 2h + i$, $f_y = -a - 2d - g + c + 2f + i$, flatness detection value = $abs(f_x) + abs(f_y)$.

Referring to method 300 of FIG. 3, the flatness detection value for each pixel is compared to a flatness threshold value (flt_th) at 320. If a flatness detection value is less than flt_th, then the corresponding pixel is classified as a flat pixel. Otherwise, the pixel is considered to be non-flat. The number of flat pixels are also counted by flat region detection logic 150 at 330. Once all of the pixels of a previous input frame of image pixel data (or zone or region thereof) are processed, the number of pixels classified as flat (i.e., flat area rate in FIG. 3) are compared to a threshold value (nr_prc) at 340. If the flat area rate is greater than nr_prc, the previous input frame of image pixel data (or zone) is considered to be flat, meaning that the brightness component content is of low activity. Therefore, any over-amplified noise in the input frame (or zone) may be easily observed by human eyes.

Once an input frame of image pixel data (or zone) is determined to be flat, the flat pixels are next considered for noise. The pixels that are classified as being flat are passed to noise detection logic 160 along with other pixels in the previous input frame of image pixel data (or zone). Using the same kernel 400, noise detection logic 160 generates a variance value at 350 for each flat pixel of the previous input frame of image pixel data as follows:

variance value = $(a - 2b + c) - 2(d - 2e + f) + (g - 2h + i)$, where the variance value takes into consideration both horizontal and vertical directions of the frame. Each term in parentheses ( ) computes the difference in the horizontal direction. The three (3) terms in parentheses ( ) are combined together with different signs (+, −, +) such that the difference in the vertical direction is taken into consideration.

Referring to method 300 of FIG. 3, the variance value for each flat pixel is compared to a threshold value (nr_th) at 360. If a variance value is greater than nr_th, then the corresponding pixel is classified as a noisy pixel. Otherwise, the pixel is considered to be non-noisy. The number of noisy pixels are also counted by noise detection logic 160 at 370. As a result, the number of pixels that are both flat and noisy are designated as $num_{flat\_noise}$. At 380, a determination is made with respect whether there are more pixels in the current picture to process. Method 300 reverts back to 310 when there are more pixels to process.

Referring again to FIG. 1, the value for $num_{flat\_noise}$ is passed to contrast restriction logic 170. Contrast restriction logic 170 is configured to restrict an amount of contrast enhancement that is provided by histogram mapping logic 110 as described above herein. The amount of contrast enhancement is limited or restricted based at least in part on the number of the noisy pixels, $num_{flat\_noise}$, and the total number of pixels, total_num, in the previous input frame (or zone). In one embodiment, an adjusted maximum slope value ($max\_slope_{adj}$) is generated and used by contrast restriction logic 170 to effectively control the maximum slope (max_slope) of an input-to-output luma function (i.e., the cumulative transfer function derived from the stretched histogram) as follows:

$noise_{prc} = num_{flat\_noise} / total\_num$, (where $noise_{prc}$ is the a percentage of flat and noisy pixels in the input frame or zone);

if $noise_{prc} < noise\_prc_{th}$, (where $noise\_prc_{th}$ is a threshold value), then adj = 128, otherwise, adj = $[128 + 3*(noise\_prc_{th} - noise_{prc})]$;

$max\_slope_{adj} = (max\_slope * adj) / 128$, where max_slope is the original limited maximum slope of the cumulative transfer function derived from the stretched histogram by histogram mapping logic 110, and $max\_slope_{adj}$ is the adjusted maximum slope.

The adjusted maximum slope, $max\_slope_{adj}$, results in further restricting or limiting the amount of contrast enhancement when applied to the contrast-enhanced frame of image pixel data out of histogram mapping logic 110 by contrast restriction logic 170. In this manner, contrast will not be enhanced so much as to allow easy visualization, by the human eye, of white noise that may be present in an input frame of image pixel data.

Again, the various processing functions described above herein may be performed separately for different brightness regions or zones of image pixel data. FIG. 2 shows three (3) different primary brightness regions or zones. However, fewer or more regions of brightness may be defined and processed, in accordance with various other embodiments.

Figure 5:
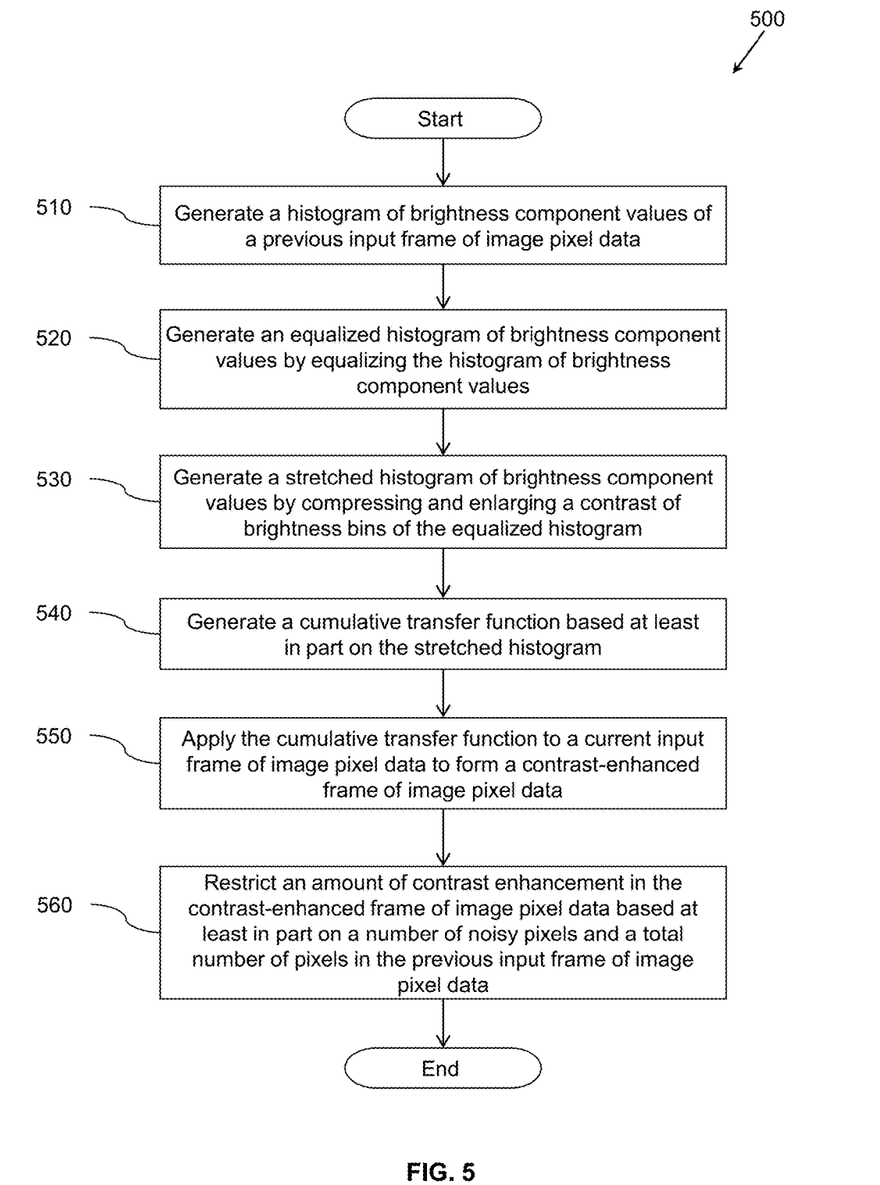
FIG. 5. illustrates one embodiment of a method, performable by the image processing device of FIG. 1, to enhance the contrast of video frames of image pixel data.

FIG. 5. illustrates one embodiment of a method 500, performable by an image processing device, such as the image processing device 100 of FIG. 1, to enhance the contrast of video frames of image pixel data. FIG. 5 captures, in flow chart form, the functions and processes previously discussed herein with respect to FIGS. 1-4. Method 500 can be performed by the logics (e.g., modules) of the image processing device 100 of FIG. 1, or by another computing device (e.g., an integrated circuit device) configured with an algorithm of method 500. Method 500 will be described from the perspective that input frames of image pixel data may be acquired by and/or originate from an image related device such as, for example, a video camera device. Again, in accordance with one embodiment, the image processing device 100 may be a part of the image related device. In accordance with another embodiment, the image processing device 100 may be separate from the image related device and may be configured to operably connect to the image related device via an operable connection (e.g., via a network connection).

Upon initiating method 500, at 510, an image processing device generates a histogram of brightness (e.g., luma) component values of a previous frame of image pixel data, and stores the generated histogram in a histogram data structure. In accordance with one embodiment, histogram equalization logic 130 generates the histogram of brightness component values. In accordance with another embodiment, frame delay logic 120 generates the histogram of brightness component values.

At 520, histogram equalization logic 130 generates an equalized histogram of brightness component values by equalizing the histogram of brightness component values, and stores the equalized histogram of brightness component values in an equalization data structure. Details of the process of histogram equalization have been previously discussed herein.

At 530, histogram stretching logic 140 generates a stretched histogram of brightness component values by compressing and enlarging a contrast of the brightness bins of the equalized histogram, and stores the histogram of brightness component values in a stretch data structure. Details of the process of generating a stretched histogram have been previously discussed herein.

At 540, histogram mapping logic 110 generates a cumulative transfer function based at least in part on the stretched histogram, and stores the cumulative transfer function in a transfer function data structure. Details of the process of generating a cumulative transfer function have been previously discussed herein. In another embodiment, generation of the cumulative transfer function is performed by histogram stretching logic 140.

At 550, histogram mapping logic 110 applies the cumulative transfer function to a current input frame of image pixel data to form a contrast-enhanced frame of image pixel data stored in an enhancement data structure. Details of the process of applying the cumulative transfer function to the current input frame of image pixel data have been previously discussed herein.

At 560, contrast restriction logic 170 restricts an amount of contrast enhancement provided by the cumulative transfer function in the contrast-enhanced frame of image pixel data. Details of the process of restricting or limiting contrast enhancement have been previously discussed herein. Contrast restriction is based at least in part on a number of pixels classified as flat and noisy in the previous input frame (or zone) of image pixel data, and a total number of pixels in the previous input frame (or zone) of image pixel data. Details of the process of classifying pixels as flat and noisy have been previously discussed herein. In accordance with one embodiment, the process of classifying pixels as flat and noisy is performed by flat region detection logic 150 and noise detection logic 160.

In this manner, as a current input frame of image pixel data comes into the image processing device 100, characteristics of a previous input frame of image pixel data are used to process the current input frame of image pixel data to enhance contrast without accentuating noise.

Integrated Circuit Device Embodiment

FIG. 6 illustrates one embodiment of the image processing device 100 of FIG. 1 implemented as an integrated circuit device 600. In this embodiment, the histogram mapping logic 110 and the contrast restriction logic 170 are each embodied on the same integrated circuit 610. The histogram equalization logic 130 and the histogram stretching logic 140 are each embodied on the same integrated circuit 620. The flat region detection logic 150 and the noise detection logic 160 are each embodied on the same integrated circuit 630. Frame delay logic 120 is embodied on integrated circuit 640.

The circuits are connected via connection paths to communicate signals. While integrated circuits 610, 620, 630, and 640 are illustrated as separate integrated circuits, they may be integrated into a common integrated circuit device 600. Additionally, integrated circuits 610, 620, 630, and 640 may be combined into fewer integrated circuits or divided into more integrated circuits than illustrated. Similarly, the image processing device 100 of FIG. 1 may be implemented as an integrated circuit device, in accordance with certain embodiments.

In another embodiment, the histogram mapping logic 110, the contrast restriction logic 170, the histogram equalization logic 130, the histogram stretching logic 140, the flat region detection logic 150, the noise detection logic 160, and the frame delay logic 120 (which are illustrated in integrated circuits 610, 620, 630, and 640) may be combined into a separate application-specific integrated circuit. In other embodiments, portions of the functionality associated with the histogram mapping logic 110, the contrast restriction logic 170, the histogram equalization logic 130, the histogram stretching logic 140, the flat region detection logic 150, the noise detection logic 160, and the frame delay logic 120 may be embodied as firmware executable by a processor and stored in a non-transitory memory (e.g., a non-transitory computer storage medium).

Systems, methods, and other embodiments associated with performing contrast enhancement of frames of video images have been described. A previous input frame of image pixel data is analyzed to determine how to process a current input frame of image pixel data to enhance contrast. In one embodiment, a histogram of brightness component values of the previous input frame of image pixel data is generated. An equalized histogram of brightness component values is then generated by equalizing the histogram of brightness component values. A stretched histogram of brightness component values is generated by compressing and enlarging a contrast of brightness bins of the equalized histogram. A cumulative transfer function is generated, based on the stretched histogram, and is applied to the current input frame of image pixel data to form a contrast-enhanced frame of image pixel data. Noise characteristics of the previous input frame of image pixel data are also analyzed and used to limit the amount of contrast enhancement in the current input frame of image pixel data.

Definitions and Other Embodiments

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

An "operable (or operative) connection", or a connection by which entities are "operably (or operatively) connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection. The terms "operable" and "operative", and there various forms, may be used interchangeably herein.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

What is claimed is:

1. An apparatus comprising:
   a histogram stretching module, including instructions stored in a non-transitory computer-readable medium, configured to generate a stretched histogram by compressing and enlarging a contrast of brightness bins of an equalized histogram of brightness component values, wherein the equalized histogram of brightness component values is formed based on a previous input frame of image pixel data;

a flat region detection module, including instructions stored in the non-transitory computer-readable medium, configured to classify pixels of the previous input frame of image pixel data as being flat pixels or non-flat pixels based at least in part on a variance in a brightness component content associated with the flat pixels being less than a variance in a brightness component content associated with the non-flat pixels, and to count a number of the flat pixels; and a noise detection module, including instructions stored in the non-transitory computer-readable medium, configured to further classify the flat pixels as being pixels that contain noise or pixels that do not contain noise, and to count a number of the pixels that contain noise.

2. The apparatus of claim 1, further comprising a frame delay buffer memory configured to store the previous input frame of image pixel data.

3. The apparatus of claim 1, wherein the brightness component values are luma component values.

4. The apparatus of claim 1, further comprising a histogram mapping module, including instructions stored in the non-transitory computer-readable medium, configured to:
(i) generate a cumulative transfer function based at least in part on the stretched histogram, and
(ii) apply the cumulative transfer function to a current input frame of image pixel data to form a contrast-enhanced frame of image pixel data.

5. The apparatus of claim 4, wherein pixels of the current input frame of image pixel data, having brightness component values that fall within guard bands of brightness, are not modified by the apparatus.

6. The apparatus of claim 4, further comprising a contrast restriction module, including instructions stored in the non-transitory computer-readable medium, configured to restrict an amount of contrast enhancement, provided by the cumulative transfer function to the contrast-enhanced frame of image pixel data, based at least in part on the number of the pixels that contain noise and a total number of pixels in the previous input frame of image pixel data.

7. The apparatus of claim 6, wherein pixels of the current input frame of image pixel data are processed by the histogram mapping module and the contrast restriction module based on regions of brightness to which brightness component values of the pixels correspond.

8. The apparatus of claim 1, further comprising a histogram equalization module, including instructions stored in the non-transitory computer-readable medium, configured to generate the equalized histogram of brightness component values of the previous input frame of image pixel data.

9. The apparatus of claim 8, wherein pixels of the previous input frame of image pixel data are processed by the histogram equalization module, the histogram stretching module, the flat region detection module, and the noise detection module based on regions of brightness to which the brightness component values of the pixels correspond.

10. A computer-implemented method comprising:
generating a histogram of brightness component values, stored in a histogram data structure, of a previous input frame of image pixel data;
generating an equalized histogram of brightness component values, stored in an equalization data structure, by equalizing the histogram of brightness component values;
generating a stretched histogram of brightness component values, stored in a stretch data structure, by compressing and enlarging a contrast of brightness bins of the equalized histogram;
generating a cumulative transfer function, stored in a transfer function data structure, based at least in part on the stretched histogram;
applying the cumulative transfer function to a current input frame of image pixel data to form a contrast-enhanced frame of image pixel data stored in an enhancement data structure;
classifying pixels of the previous input frame of image pixel data as being flat pixels or non-flat pixels based at least in part on a variance in a brightness component content associated with the flat pixels being less than a variance in a brightness component content associated with the non-flat pixels, and counting a number of the flat pixels; and
classifying the flat pixels as being pixels that contain noise or pixels that do not contain noise, and counting a number of the pixels that contain noise.

11. The method of claim 10, wherein pixels of the previous input frame of image pixel data are processed based on regions of brightness to which the brightness component values of the pixels belong.

12. The method of claim 10, wherein pixels of the current input frame of image pixel data are processed based on regions of brightness to which brightness component values of the pixels belong.

13. The method of claim 10, further comprising restricting an amount of contrast enhancement, provided by the cumulative transfer function to the contrast-enhanced frame of image pixel data in the enhancement data structure, based at least in part on the number of the pixels that contain noise and a total number of pixels in the previous input frame of image pixel data.

14. An integrated circuit device, the integrated circuit device comprising:
histogram equalization logic configured to generate an equalized histogram of brightness component values of a previous input frame of image pixel data;
histogram stretching logic configured to generate a stretched histogram by compressing and enlarging a contrast of brightness bins of the equalized histogram;
noise detection logic configured to classify pixels of the previous input frame of image pixel data as being pixels that contain noise or pixels that do not contain noise, and to count a number of the pixels that contain noise; and
flat region detection logic configured to classify the pixels of the previous input frame of image pixel data as being flat pixels or non-flat pixels based at least in part on a variance in a brightness component content associated with the flat pixels being less than a variance in a brightness component content associated with the non-flat pixels, and to count a number of the flat pixels.

15. The integrated circuit device of claim 14, further comprising frame delay logic configured to store the previous input frame of image pixel data.

16. The integrated circuit device of claim 14, further comprising histogram mapping logic configured to:
(i) generate a cumulative transfer function based at least in part on the stretched histogram, and (ii) apply the cumulative transfer function to a current input frame of image pixel data to form a contrast-enhanced frame of image pixel data.

17. The integrated circuit device of claim 16, further comprising contrast restriction logic configured to restrict an amount of contrast enhancement, provided by the cumulative transfer function to the contrast-enhanced frame of image pixel data, based at least in part on the number of the pixels that contain noise and a total number of pixels in the previous input frame of image pixel data.

* * * * *